United States Patent
Wismar (10) Patent No.: US 8,710,822 B2
(45) Date of Patent: Apr. 29, 2014

(54) MULTI-STATE DC-DC CONVERTER HAVING UNDIRECTIONAL SWITCHES

(75) Inventor: Ulrik Sørensen Wismar, Kalundborg (DK)

(73) Assignee: Analog Devices, Inc., Norwood, MA (US)

( * ) Notice: Subject to any disclaimer, the term of this patent is extended or adjusted under 35 U.S.C. 154(b) by 295 days.

(21) Appl. No.: 13/123,799

(22) PCT Filed: Sep. 30, 2009

(86) PCT No.: PCT/EP2009/062663
§ 371 (c)(1), (2), (4) Date: Jul. 19, 2011

(87) PCT Pub. No.: WO2010/043499
PCT Pub. Date: Apr. 22, 2010

(65) Prior Publication Data
US 2011/0267142 A1   Nov. 3, 2011

Related U.S. Application Data

(60) Provisional application No. 61/104,823, filed on Oct. 13, 2008.

(51) Int. Cl.
  *H02M 3/156* (2006.01)
  *G05F 1/00* (2006.01)
(52) U.S. Cl.
  USPC ............................. 323/351; 323/266; 323/283
(58) Field of Classification Search
  USPC .......................... 323/351, 283, 266
  See application file for complete search history.

(56) References Cited

U.S. PATENT DOCUMENTS

| | | | |
|---|---|---|---|
| 6,075,295 A | 6/2000 | Li | |
| 6,304,138 B1 * | 10/2001 | Johnson | 330/69 |
| 6,326,774 B1 * | 12/2001 | Mueller et al. | 323/222 |
| 6,710,639 B2 * | 3/2004 | Huang et al. | 327/438 |
| 7,327,124 B2 * | 2/2008 | Liu et al. | 323/267 |
| 2002/0105307 A1 * | 8/2002 | Groeneveld et al. | 323/282 |
| 2004/0135562 A1 | 7/2004 | Oden | |
| 2005/0088160 A1 | 4/2005 | Tanaka et al. | |
| 2005/0218870 A1 * | 10/2005 | Lys | 323/222 |
| 2006/0214648 A1 | 9/2006 | Liu et al. | |
| 2007/0262760 A1 | 11/2007 | Liu | |
| 2009/0039850 A1 * | 2/2009 | Mariani et al. | 323/283 |

FOREIGN PATENT DOCUMENTS

| | | |
|---|---|---|
| DE | 33 16 251 | 11/1984 |
| DE | 10 2006 032418 | 1/2008 |
| JP | 2000 287441 | 10/2000 |

OTHER PUBLICATIONS

European Patent Office, International Search Report for International application No. PCT/EP2009/062663, Nov. 24, 2009.

* cited by examiner

*Primary Examiner* — Adolf Berhane
*Assistant Examiner* — Emily P Pham
(74) *Attorney, Agent, or Firm* — Kenyon & Kenyon, LLP (57) ABSTRACT

DC-DC converters adapted to provide two or more DC output voltages. More particularly, a multi-state or mode DC-DC converter circuit comprising first and second controllable switches configured for unidirectional conduction of charging current.

20 Claims, 4 Drawing Sheets

MULTI-STATE DC-DC CONVERTER HAVING UNIDIRECTIONAL SWITCHES

RELATED APPLICATIONS

This application is a 35 U.S.C. §371 National Phase of International Application No. PCT/EP2009/062663 filed on Sep. 30, 2009, which claims priority to U.S. Provisional Application No. 61/104,823 filed on Oct. 13, 2008, the disclosures of which are herein incorporated by reference in their entireties.

FIELD OF THE INVENTION

The present invention generally relates to DC-DC converters adapted to provide two or more DC output voltages. More particularly, the invention relates to a multi-state or mode DC-DC converter circuit comprising first and second controllable switches configured for unidirectional conduction of charging current.

BACKGROUND OF THE INVENTION

DC to DC (DC-DC) converters are in wide-spread use in portable electronic devices, which are primarily supplied with power from batteries. The portable electronic devices may be mobile terminals or portable entertainment equipment such as mobile phones, MP3 players, headphones, speakers, cellular phones, laptop computers etc.

Such portable devices often contain several sub-circuits with their own DC voltage requirements different from a DC supply voltage supplied by the battery or an external power supply. Furthermore, the DC supply voltage delivered by the battery declines as stored energy is drained.

Switch-mode DC-DC converters are operable to convert an incoming or input DC voltage level to another DC voltage level by temporarily storing the input energy and subsequently releasing stored energy to a DC output voltage node or terminal. The temporary energy storage may be in either magnetic components (for example inductors, transformers) and/or capacitive components.

By adjusting the Pulse Width Modulated (PWM) Duty Cycle of one or more controllable switches (the ratio of on/off time), the amount of power transferred can be controlled.

In a step-down or buck-mode converter a generated DC output voltage lies inside a DC voltage range between DC input voltage rails supplying power to the buck-mode converter. In a step-up, or boost-mode, DC-DC converter the DC output voltage lies outside the DC voltage range between the DC input voltage rails supplying power to the boost-mode converter. The DC output voltage may be negative relative to ground.

Both buck and boost mode converters comprise an inductor and two controllable switches coupled to the inductor. Each controllable switch is typically a controllable transistor or and a diode. The controllable switches control charging and discharging of the inductor. The DC-DC converter alternates between connecting the inductor to the DC input voltage, in order to store energy in the inductor, and discharging the inductor into a load.

Magnetic DC-DC converters are generally classified in one of two types according to a flow of current in its magnetic component (for example inductor or transformer):

Continuous mode where the level of current fluctuates in the magnetic component, but never goes down to zero;

Discontinuous mode where the current level fluctuates during a conversion cycle and drops to zero at an end of each conversion cycle.

US2005/0088160 discloses a multi output DC-DC converter provided with a main switch which is turned on and off at a predetermined cycle, and which applies the input DC voltage of the DC power source to the inductor when turned on; a plurality of diodes which rectify a voltage generated in the inductor when the main switch is off; an auxiliary switch connected in series to each of the plurality of diodes; and a plurality of capacitors connected to the respective series circuits of the plurality of diodes and the auxiliary switch, which respectively output a plurality of output voltages.

US2007/0262760 discloses a single-inductor DC-DC convert capable of delivering multiple DC output voltages. One of the output voltages is always higher than the input voltage, while other output voltages may be higher or lower than the input voltage. The DC-DC converter requires no input power switch connected between the input voltage source and the power inductor. The DC-DC converter delivers power to all output voltages during the same switching cycle. The highest output voltage is used to reset the inductor current.

U.S. Pat. No. 6,075,295 discloses a DC-DC converter delivering two or more DC output voltages from one input voltage and one inductor. Each DC output voltage is formed by a switch controlling the charge delivered to each of the corresponding output capacitors. The controller utilizes pulse width modulation to deliver the correct amount of energy to each load and to synchronize the order of energy delivery to the loads. A predetermined DC voltage level for each load is changed by re-programming the controller thereby modifying the duration and frequency of the pulse received by the respective load from the charging inductor.

US2004/0135562 discloses a switch mode power supply for producing a plurality of DC output voltages using a single inductor. The inductor is provided with opposing first and second terminals. A first switch is connected between the first terminal and a source of electrical power to charge the inductor. A negative output of the power supply comprises a first capacitor and a second switch which switches electrical current from the first terminal to the negative output. A positive DC output of the switch mode power supply comprises a second capacitor and a third switch which switches electrical current from the second terminal to the positive output. Energy is stored in the inductor during an inductor charging cycle by closing the first switch. The stored energy is transferred to at least one of the negative and positive outputs during an inductor discharge cycle.

SUMMARY OF THE INVENTION

According to a first aspect of the present invention there is provided a DC-DC converter circuit comprising a coupling terminal to an inductive component and a DC supply terminal coupleable to a DC input supply voltage. A first and a second controllable switch comprise respective control terminals configured to select a state of the controllable switch. A first coupling terminal is connectable to a first capacitor serving as a positive DC voltage node relative to a ground terminal and a second coupling terminal connectable to a second capacitor serving as a negative DC voltage node relative to the ground terminal. A digital controller coupled to the respective control terminals of the first and second controllable switches is adapted to control the respective states thereof; The first controllable switch is arranged in-between the second capacitor and the inductive component and the second controllable switch is arranged in-between the first capacitor and the inductive component. The inductive component is coupled between the first and the second capacitor for supplying charging current to at least one of the first and second capacitors in at least a first, a second, and a third converter state under control of the digital controller.

In the first converter state, the digital controller is adapted to set or select a closed state of the second controllable switch to supply charging current to the first capacitor through the inductive component; In the second converter state, the first controllable switch is set to a closed state to supply charging current to the second capacitor through the inductive component and in the third converter state, the first controllable switch and the second controllable switch are set to respective closed states to supply charging current from the first capacitor to the second capacitor through the inductive component; In accordance with the invention, each of the first and second controllable switches is configured for unidirectional conduction of charging current.

The configuration or adaptation of the first and the second controllable switches for unidirectional conduction of charging current makes each of these controllable switches function as a current rectifying element or a rectifier. However, compared to traditional semiconductor diodes, current conduction of the first and the second controllable switches is not accompanied by a forward diode voltage drop which typically lies between 0.6 and 0.8 Volt or even higher for semiconductor diode types that are integrateable on a standard semiconductor process such as CMOS processes. This is a considerable advantage in DC-DC converter circuits for mobile terminals or other battery powered equipment since power conversion efficiency is increased and power losses reduced. The forward voltage drop across the first or second controllable switch caused by parasitic series resistance can easily be made much smaller than the above-mentioned forward diode voltage drop by appropriate design of the controllable switch. The absence of the forward diode voltage drop also reduces maximum voltages generated inside the DC-DC converter circuit or DC-DC converter which is advantageous due to the limited maximum voltage rating of today's sub-micron CMOS processes.

Another significant advantage of the current rectifying property of the first and the second controllable switches is an ability to automatically prevent unintended reverse flow of current, or discharge, of the first and/or second capacitors, providing the positive and negative DC output voltage, respectively, under all load conditions and external component values. This makes adaption of the present DC-DC converter to a particular application considerably simpler.

Finally, the present DC-DC converter can switch substantially instantaneously between continuous mode operation and discontinuous mode operation.

The present DC-DC converter can be adapted to operate in three or more different converter states. In a tri-state DC-DC converter embodiment, the first converter state is preferably adapted to transmit charging current to the first capacitor coupled to the positive DC output voltage to increase the positive DC output voltage. In the second converter state charging current is supplied to the second capacitor coupled to the negative DC output voltage to increase the absolute value of the negative DC output voltage. Finally, the tri-state DC-DC converter is configured to supply charging current to both the positive and negative DC output voltage simultaneously during the third converter state to increase absolute values of both DC output voltages provided by the converter. However, the skilled person will understand that other embodiments of the present DC-DC converter may comprise one or more additional converter states. An additional converter state is preferably accompanied by an additional internal or external capacitor coupled to the DC-DC converter through an additional controllable switch configured for unidirectional conduction or rectification of charging current flowing there through. The additional internal or external capacitor stores charge for an additional DC output voltage generated in the fourth converter mode.

The first controllable switch is preferably arranged between the second capacitor and a first end of the inductive component and the second controllable switch is arranged between the first capacitor and an opposite or second end of the inductive component.

The inductive component may be integrated on a semiconductor substrate with the DC-DC converter circuit or the inductive component may be external to a semiconductor substrate or die on which the DC-DC converter circuit is integrated. The inductive component preferably comprises an inductor or transformer such as a wire wound inductor or a coil with an inductance between 0.2 $\mu$H and 100 $\mu$H such as between 1 $\mu$H and 20 $\mu$H.

The present DC-DC converter may be used to keep essentially constant drain-source voltage across an output transistor of an output driver transistor of an audio amplifier. A comparator may be configured to detect the drain-source voltage across a positive driver transistor and generates a first error signal if this voltage drops below a preset threshold. The DC-DC converter may be responsive to the error signal and adapted to charge the positive DC voltage node until the error signal disappears. A similar arrangement may be coupled to a negative driver transistor error signal to make the DC-DC converter begin charging the negative DC voltage node in response to a second error signal. The error signals accordingly indicate that a DC voltage node of the DC-DC converter is outside a target range or threshold so that charge should be supplied to the DC voltage node in question to increase the absolute value of the DC voltage. The error signal can also be viewed as charge request signal indicating that charge or energy should be supplied to a particular DC voltage node of the DC-DC converter.

The unidirectional current conduction of the first and second switches enables the present DC-DC converter circuit to be adapted to only charge and not discharge the positive and negative DC voltage nodes. This prevents instability if the present DC-DC converter circuit forms part of a feedback controlled voltage regulation system where the positive or negative DC voltage nodes are part of a feedback loop.

Another advantage of present DC-DC converter is its ability to produce required or requested time-varying DC output voltages in a flexible and adaptive manner as opposed to only producing a fixed or preset DC voltage output level or value as known in the prior art. Thus the present DC-DC converter may provide any specific DC output voltage or voltages within its intended or designed operating range for DC output voltages.

In one preferred embodiment of the invention, each, or at least one, of the first and the second controllable switches is adapted to:
  sense a direction of charging current flowing through the controllable switch,
  change state of the controllable switch in response to a change of direction of the charging current. The charging current may be sensed directly by a current sensor or indirectly by detecting or measuring a voltage drop across a known resistance inside the controllable switch through which the charging current flows. In the latter situation, each of the first and the second controllable switches comprises a series resistance coupled in-between input and output nodes of the controllable switch. A current sensing circuit is configured to sense the direction of the charging current flowing through the series resistance and control a state of the controllable switch in accordance the direction of the charging current. In an attractive variant, the series resistance of the first or second controllable switch comprises an on-resistance of a semiconductor transistor. By using the inherent on-resistance of the semiconductor transistor to sense the direction of charging current flowing through the first or second controllable switch, power losses and semiconductor die area penalties are prevented.

In one embodiment, the current sensing circuit comprises a comparator operatively coupled across the series resistance of the first or second controllable switch. This allows the comparator to detect and respond to a voltage drop across the series resistance at a comparator output. The comparator may be adapted to provide a pair of binary output voltages representing logic high, "1" or low "0" that are compatible with logic levels used in the controllable switch.

Each of the first and the second controllable switches may comprise a semiconductor transistor such as a MOS, preferably CMOS, transistor. MOS transistors can be fabricated with very low on-resistance, such as less than 500 mΩ, or less than 100 mΩ, or even lower, in form of its drain-source resistance in triode region operation. Furthermore, MOS transistors with such very low on-resistances can be fabricated without occupying large semiconductor substrate areas in sub-micron CMOS processes. Consequently, manufacturing costs of the DC-DC converter circuit can be kept low. Furthermore, the gate terminal of a CMOS transistor which may function as the control terminal or input of the controllable switch usually exhibits large input impedance and can readily be interfaced to, or driven by, normal CMOS logic gates to provide convenient digital control over the state of controllable switch.

According to a preferred embodiment of the present DC-DC converter circuit, the current sensing circuit is adapted to:
responding to a predetermined logic level on the control terminal of the first or second controllable switch by setting the first or second controllable switch to a closed state. The current sensing circuit automatically changes from the closed to the open state in response to a change of direction of the charging current flowing through the controllable switch. In an advantageous variant, the current sensing circuit is additionally responsive to a second predetermined logic level on the control terminal to change from the closed to the open state. In this manner the first or second controllable switch may either automatically change to its open state in response to a change of direction of the charging current it may be forced to its open state by the digital controller. However, in both embodiments, the digital controller can manipulate the control terminal or terminals to force the first and/or second controllable switches to closed states by simple level based logic signals.

In certain embodiments of the invention, the DC-DC converter circuit is configured to change between continuous and discontinuous mode operation substantially instantaneously depending on a loading of the negative or positive DC voltage node. The ability of this DC-DC converter embodiment to change from one to another one of the first, second and third converter states substantially instantaneously independent of the charging current in the inductive component in response to a request for state switching represents a significant advantage. This means the DC-DC converter circuit can respond very rapidly if charge is required on the first or second capacitor to maintain voltage on the positive or negative DC voltage nodes within respective prescribed limits. For example, if the DC-DC converter operates in the first state charging the positive DC voltage node, and the error signal remains after the first pulse, the pulse generator may generate a second pulse. If the error signal subsequently indicates an error on the negative DC voltage node as well, the DC-DC converter switches to the third converter state before the second pulse arrives so as to charge both the positive and negative DC voltage nodes simultaneously even though the inductive component failed to discharge in time.

In another embodiment of the present DC-DC converter circuit the digital controller is configured to discharge energy stored in the inductive component to substantially zero after each charging of the inductive component from the DC input supply voltage. This may lead to a short time delay in changing from one to another one of the first, second and third converter states, but has the advantage that supply ripple voltage on the positive and negative DC output voltages is known to be within predetermined limits.

According to yet another embodiment, the digital controller is adapted to generate and apply respective control signals to the control terminals of the first and second controllable switches. Each control signal comprises one or more pulses during each of the first, second and third converter states. The digital controller may be adapted to generate the one or more pulses in response to an error control signal associated with a particular one of the first, second and third converter states in a manner where the error control signal in question is indicative of a difference between an actual or measured DC output of voltage of the present DC-DC converter and an associated reference voltage value or range. The error control signal may be adapted to maintain essentially constant drain-source voltage across an output transistor of a class-H audio amplifier by appropriately adapting or steering the negative and positive DC output voltages of the DC-DC converter. This allows DC power supply rails of the class-H audio amplifier to track instantaneous amplitude of an audio output signal applied to an amplifier load such as a loudspeaker.

In a particular advantageous embodiment, the one or more pulses of each control signal are of substantially constant duration. The substantially constant duration or width of the one or more pulses of each of the control signals independent of the converter state or any change thereof makes it possible to provide DC output voltage regulation on at least one of the positive and negative DC voltage nodes by changing the pulse repetition period or frequency (i.e. using pulse density modulated control signals) during a converter state. According to this embodiment, the digital controller is configured to regulate a positive DC output voltage on the positive DC voltage node by controlling a number of pulses of the control signal supplied to the second controllable switch during the first converter state.

Furthermore, the negative DC output voltage on the negative DC voltage node is preferably also regulated by controlling a number of pulses of the control signal supplied to the first controllable switch during the second converter state.

One advantage of using a substantially constant pulse width and varying the pulse frequency or density depending on the actual loading of the positive and/or negative DC voltage nodes is that the respective control signals for the first and second controllable switches, and optionally additional corresponding control signals for additional controllable switches as explained below, can be kept strictly digital. Furthermore, an amount of energy placed in the inductive component per pulse can be determined in all situations.

The DC-DC converter circuit is preferably adapted to be capable of changing converter state from one to another one of the first, second and third converter states for each pulse of the one or more pulses. This is possible since each of the first, second and third converter states can be started both with and without magnetic energy stored in the inductive component. This property makes it possible to change between the converter states before arrival of each new pulse if the error controls signal changes to indicate that a change of converter state is required to maintain one or both of the positive and negative DC output voltages within respective predetermined voltage limits or ranges.

The DC-DC converter preferably comprises a number of additional controllable switches controlled by the digital controller by means of respective control signals supplied to control terminals of the number of additional controllable switches. Each of the number of additional controllable switches can accordingly be set to an open or closed state by the digital controller by means of the associated control signal. Each of these additional controllable switches is preferably a normal semiconductor switch capable of conducting current through the switch in both directions when placed in a closed state. The number of additional controllable switches may comprise a third, a fourth and fifth controllable switch. The third controllable switch being coupled in-between the DC input voltage and a first end of the inductive component and a fourth controllable switch coupled in-between the first end of the inductive component and ground. The fifth controllable switch is coupled in-between a second end of the inductive component and ground. In the first converter state, the digital controller is adapted to close the second controllable switch and the third controllable switch by applying respective control signals so as to charge the first capacitor holding the positive DC output voltage. Thereafter, the third controllable switch is opened and the fourth controllable switch closed to discharge the inductive component.

In the second converter state, the digital controller is adapted to close the third and fifth controllable switches so as to charge the inductive component and subsequently open the third controllable switch while keeping the fifth controllable switch closed and closing the first controllable switch. The energy or current in the inductive component is thereby discharged through the second capacitor so as to charge the negative DC output voltage to a more negative DC voltage. In the third converter state, the digital controller is adapted to close the third and fifth controllable switches to charge the inductive component with magnetic energy. Subsequently, the third and fifth controllable switches are opened and the first and the second controllable switches closed whereby charging current in the inductive component is discharged from second capacitor to the first capacitor to substantially simultaneously charge both the second and the first capacitor.

According to a second aspect of the present invention there is provided a class-H amplifier assembly which comprises a DC-DC converter circuit according to any of the above-described a DC-DC converter embodiments and a class-H amplifier comprising a positive DC power supply rail and a negative DC power supply rail. The positive DC voltage node and the negative DC voltage node of the DC-DC converter circuit is operatively coupled to the positive and negative DC power supply rails, respectively of the class-H amplifier. The class-H amplifier assembly is particularly useful as a loudspeaker driver for sound reproduction in mobile terminals and portable entertainment equipment such as mobile phones, smart phones, MP3 players etc. where high energy efficiency, compact layout and relatively low costs are important.

In some embodiments the present DC-DC converter is adapted to generate negative DC output voltages down to −1.6 V, preferably down to at least −1.8 volt, and positive DC output voltages up to at least +1.6 volt, preferably up to at least +1.8 V. The present DC-DC converter may be adapted to operate on DC input supply voltages within a range between 2.0 and 5.0 volt such as between 2.3 and 4.8 volt. This DC voltage range is useful for many portable equipment applications wherein a rechargeable battery, or a battery pack, provides DC voltages in that range.

In other useful embodiments, the DC-DC converter may comprise one or more safety circuits, such as short circuit protection, over-current or over-voltage protection, safe power-up and power-down circuit, to provide protection against unintended or unsafe operation conditions in an external environment surrounding the DC-DC converter.

BRIEF DESCRIPTION OF THE DRAWINGS

The above and/or additional objects, features and advantages of the present invention, will be further elucidated by the following illustrative and non-limiting detailed description of embodiments of the present invention, with reference to the appended drawings, wherein.

DETAILED DESCRIPTION OF PREFERRED EMBODIMENTS

In the following section reference is made to the accompanying figures, which show by way of illustration a preferred embodiment of the invention.

Figure 1:
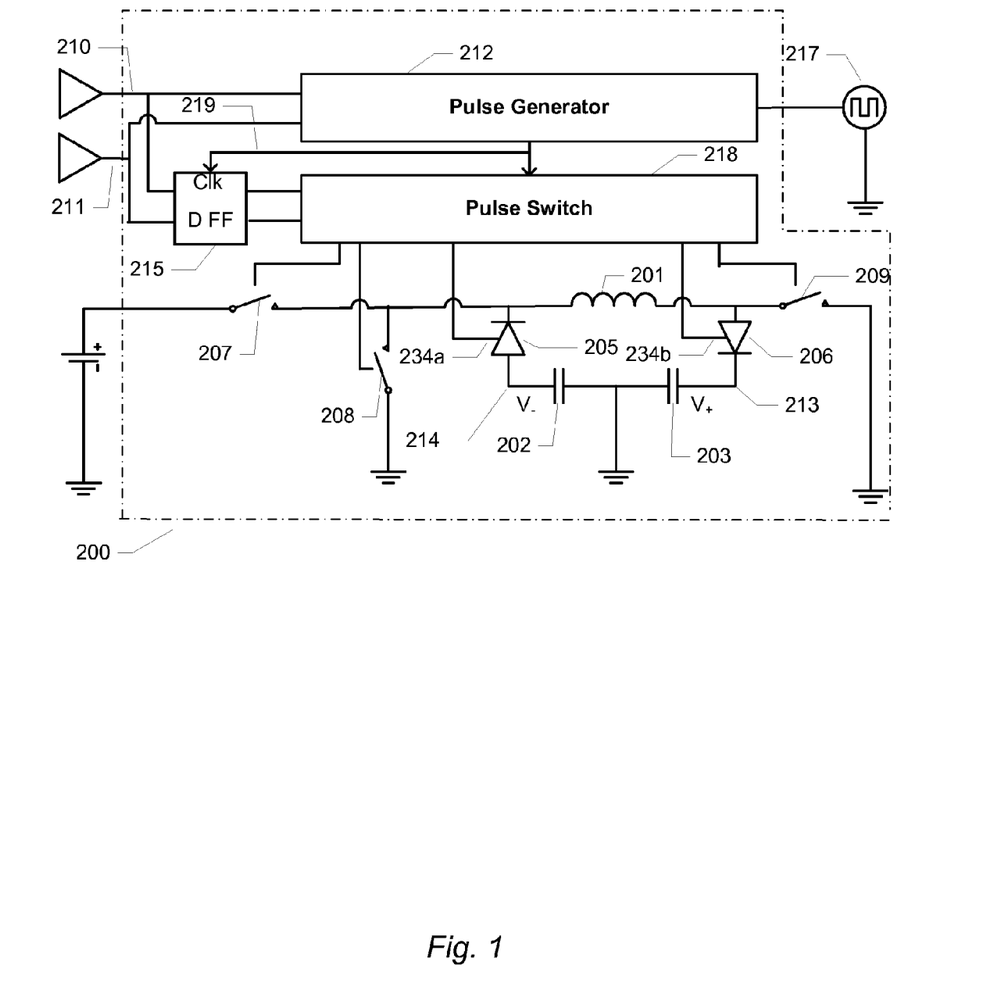
FIG. 1 is a simplified schematic diagram of a DC-DC converter assembly comprising a DC-DC converter circuit in accordance with a first embodiment of the invention.

FIG. 1 depicts a simplified schematic diagram of a DC-DC converter assembly 200 comprising a DC-DC converter circuit in accordance with a preferred embodiment of the invention. The DC-DC converter circuit or DC-DC converter is coupled to a pair of external supply capacitors 202, 203 and an external inductor 201 by respective coupling terminals (not shown) to form the present DC-DC converter assembly 200. The DC-DC converter is well-suited to produce adaptive or adjustable positive and negative DC supply voltages for a class-H audio amplifier. However, it is understood that the illustrated DC-DC converter may be connected to other types of loads.

The positive and negative DC output voltages from the DC-DC converter should track output signal amplitude of the interconnected class-H audio amplifier (400 on FIG. 4) with an essentially constant drain-source voltage across output transistor of the class-H audio amplifier, i.e. a fixed value of e.g. 150 mV. The positive DC voltage output will be larger than 0 V such as between 1.0 and 1.8 Volt and the negative voltage DC output value will be below 0 V such as between 0 and −1.8 V.

The DC-DC converter assembly 200 may use just a single inductive component 201 together with two μF-sized (for example between 0.5 and 10 μF) output or supply capacitors 202, 203. The inductive component 201 may be arranged externally of the circuit and it may be an inductor, e.g. a coil, or the like having an inductance between 5 and 10 µH. In the following the expression inductor may be used about the inductive component 201.

A DC supply voltage 204 provided as DC input supply voltage to the DC-DC converter assembly 200 may comprise battery supply for example based on a rechargeable battery. The DC supply voltage 204 may have a level in a range between 2.3 volt and 4.8 volt. A digital controller may comprise the pulse generator 212 and the pulse switch 218 etc.

Figure 2A:
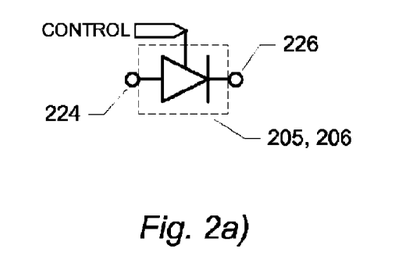
FIG. 2 is a simplified schematic diagram of a controllable switch for use in the DC-DC converter circuit depicted on FIG. 1.

The core of the DC-DC converter comprises five controllable power switches 205, 206, 207, 208 and 209 all connected to a first or second terminal of the external inductor 201 and a digital controller comprising pulse generator 212 and pulse switch 218 to form an all-digital control logic block. The pair of controllable power switches 205 and 206 are depicted as steerable diodes with respective control terminals 234a, 234b, respectively, but comprise a CMOS switch adapted for unidirectional conduction of charging current to the first and second capacitors 202, 203 as will be explained in additional detail below with reference to FIG. 2. The residual depicted controllable switches 207, 208 and 209 are in the present DC-DC converter embodiment ordinary semiconductor switches as indicated by the different type of switch symbol.

A pair of error control signals generated by a comparator block (401 of FIG. 4) is supplied through the error indicator lines 210, 211 of the DC-DC converter assembly 200. An error on the positive DC output voltage is indicated on error indicator line 210, and an error on the negative DC output voltage is indicated on error indicator line 211. When an error signal is present on either of the error indicator lines 210, 211, the pulse switch 218 is adapted to generate and transmits one or more pulse(s) in each of the control signals applied to the controllable switches 205, 206, 207, 208 and 209. The duration of each pulse of the one or more pulses is preferably essentially constant for all combinations of errors. The pulse switch 218 accordingly operates as a gating circuit for clock pulses supplied by the pulse generator 212 providing an appropriate control signal to each of the controllable switches in the core depending on which of the positive and/or negative DC output voltages that need to be charged, as indicated by the error control signals, to maintain the DC output voltage in question within a certain target range or within a predetermined threshold value.

The D flip-flop component 215 functions as a memory bank or cell which remembers past error control signals. The D flip-flop component 215 may be a clocked device comprising a clock input, Clk, as illustrated. The D flip-flop 215 is controlled by a clock signal 219 supplied by the pulse generator 212 or it may comprise other digital logic circuitry such as AND/OR gates. The D flip-flop 215 synchronises changes of one or both of error control signals to the pulse signal applied by the pulse generator 212 to the clock input of the D flip-flop 215.

Figure 2B:
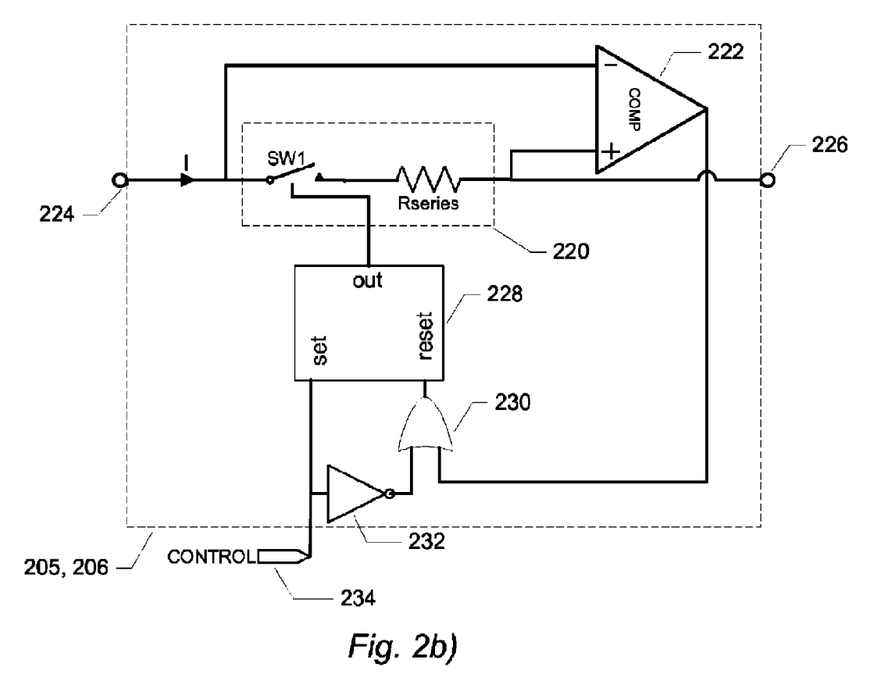

The two controllable switches 205 and 206 are an inventive type of semiconductor CMOS switches which each can be forced into a closed or on state by appropriate setting of logic level on its control terminal 234a or 234b. Once closed, each of the controllable switches 205 and 206 will discharge the external inductor 201 for a certain period of time and subsequently automatically switch to an open state once charging current flowing through the controllable switch in question changes direction or reaches zero. Each of the two controllable switches has accordingly a current rectifying function allowing charging current to pass in one direction only as explained in detail below in connection with FIGS. 2a) and b). Since each of the two controllable switches 205 and 206 may be implemented as a semiconductor switch it does not display the forward diode voltage drop of ordinary semiconductor diodes. The voltage drop across each of the controllable switches 205, 206 can be made extremely small by appropriate design of the controllable switch. If the controllable switch is implemented as a CMOS transistor, the voltage drop across input and output terminals of the controllable switch may essentially be determined by a series resistance, $R_{DS}$, between the drain and source terminals of the CMOS transistor in triode-region operation.

Three different combinations of errors may be indicated on error indicator lines 210 and 211. Either an error occurs on the positive DC voltage, the negative DC voltage, or at both of these DC voltages at the same time. Therefore, the DC-DC converter assembly 200 may operate one of three different converter states corresponding to these operating conditions. In these converter states the controllable switch operations are:

1) First state—Error signal indicating positive DC voltage output:

In this case the DC-DC converter assembly 200 operates as a buck converter. When an error signal pulse is generated for example on error indicator line 210, this error signal pulse is transmitted to an output of D flip-flop 215 at the next pulse applied to the clock input, Clk, of the D flip-flop 215 by a pulse signal derived from a clock signal generated by clock generator 217. The clock generator is preferably adapted to generate the clock signal with a frequency between 1 and 10 MHz which means the pulse may have a duration from 0.5 µS to 5 µS.

Once the pulse switch 218 senses this error signal pulse it sets controllable switches 207 and 206 to respective closed states during the pulse duration, while the residual controllable switches 205, 208 and 209 all are in respective open states or open. The positive DC voltage output on the positive DC voltage node 213 is charged from the DC supply voltage 204 through the duration of the pulse. Subsequently, controllable switch 207 in series with the DC supply voltage 204 is opened and controllable switch 208 closed. The external inductor 201 is therefore discharged to ground and if no more pulses are received because the previously indicated error has disappeared, controllable switch 206 will automatically interrupt further discharging of the external inductor once the current in the inductor 201 changes direction because of the unidirectional conduction of charging current provided by the controllable switch 206 as explained above. The DC-DC converter stays in converter state 1 awaiting the next error indication on one or both of the error indicator lines 210 and 211. On the other hand if the error indication persists, the pulse generator 212 will just keep generating and transmitting more pulses to the pulse switch of the DC-DC converter so as to keep switching forth and back between opening and closing controllable switch 207 and switch 208 in out of phase or non-overlapping manner. This will usually bring the DC-DC converter into continuous mode operation.

2) Second state—Error indication on negative DC voltage output:

In this situation the DC-DC converter operates as a boost converter charging the negative DC voltage output on the negative DC voltage node 214. When the pulse generator 212 transmits a pulse, the external inductor 201 is charged by closing of the controllable switches 207 and 209 while the residual controllable switches are set to respective open states. When the pulse ends, controllable switch 207 opens, controllable switch 209 stays closed and controllable switch 205 is closed by applying appropriate control signals from the pulse switch 218 to the respective control terminals. This causes discharge of the current flowing in the external inductor 201 through the negative DC voltage node 214 charging it to a lower voltage potential, i.e. a more negative DC voltage. If the error indication thereafter disappears, the charging of the negative DC output voltage is terminated when the charging current in the external inductor 201 changes direction because of the unidirectional conduction of charging current or rectification provided by the controllable switch 205 which automatically opens when the charging current changes direction as explained above. If the error on the other hand persists, the pulse generator 212 will continue to generate and transmit pulses and the DD-DC converter will switch forth and back between opening and closing switch 207 and switch 205 in a non-overlapping manner which will usually bring the DC-DC converter into continuous mode operation.

3) Third state—Error indication on both the positive and negative DC voltage output:

In this situation the DC-DC converter operates as a boost converter. When a pulse from the pulse generator 212 is received, the external inductor 201 is charged through the controllable switches 207 and 209 which receive respective control signals setting these switches in their respective closed states or "on" states. When the pulse ends, controllable switches 207, 209 both change state to an open state while both of the controllable switches 205 and 206 are set to respective closed states. This has the effect that inductor current is discharged from the negative DC voltage node 214 to the positive DC voltage node 213 so as to charge both DC voltage nodes 213, 214 simultaneously. Subsequently, two different scenarios are possible: Either the error indication persists or disappears after the pulse ends. If the error indication has disappeared, the charging of the positive and negative DC voltage nodes 213, 214 is interrupted by controllable switches 205 and 206 once the charging current through the supply capacitors 202 and 203 changes direction. If the error indication on the other hand continues, the controllable switches 205 and 206 are set to respective open states by the pulse switch 218 while controllable switches 207 and 209 are closed so as to recharge the external inductor 201. This can, as in the first and second converter states described above, bring the DC-DC converter into continuous mode operation Each of the three converter states can be started both with and without current in the external inductor 201. This means that the present DC-DC converter assembly 200 is capable of changing or switching between the different converter states for each new pulse. For example if an error has occurred on the positive DC output voltage, the DC-DC converter operates in the first converter state charging the positive voltage output node 213 and if the error indication persists after the first pulse, the pulse generator 212 generates a new pulse. However, if an error indication now occurs in respect of the negative DC voltage as well, the DC-DC converter is adapted to switch to the third converter state so as to charge both the positive and the negative voltage output nodes 213, 214, respectively, at the same time even though the inductor 201 did not have any time to discharge before the switch between the first and third converter mode was made.

Typically, in prior art DC-DC converters DC output voltage regulation, i.e. adapting actual DC output voltages to a preset value or preset range, has been effected by changing the pulse width of the control signals while keeping the pulse frequency constant. This is often referred to as Pulse Width Modulation (PWM). However, the present DC-DC converter is capable of effecting output voltage regulation at constant pulse width and instead changing the pulse period or repetition frequency to obtain DC output voltage regulation. By performing the DC output voltage regulation in this way, control signals for the various controllable switches can be kept completely digital and the amount of charge placed in the external inductor 201 per pulse period can be determined in all situations.

The present DC-DC converter embodiment can charge, but not discharge, the positive and negative voltage output nodes 213, 214, respectively. Due to the D flip-flop 215, the state of the DC-DC converter can only change when a new pulse arrives from the pulse generator 212. Thus the converter state cannot change during a pulse duration which results in a limitation of the operation frequency.

FIG. 2b), the lower drawing, depicts a simplified schematic diagram of a preferred implementation of each or both of the controllable switches 205 and 206 depicted on FIG. 1. For comparison purposes, the illustrated symbolic representation of the controllable switches 205, 206 on FIG. 1 is depicted on FIG. 2a) to assist a comparison between the symbolic representation of each of the controllable switches 205, 206 and its actual implementation. Each of the controllable switches 205, 206 comprises a CMOS transistor 220 modelled as a series resistance, $R_{SERIES}$, in cascade with an ideal switch, SW1, inserted in-between an input terminal 224 and an output terminal 226 of the controllable switch 205, 206. The series resistance, $R_{SERIES}$, may advantageously be formed by a drain-source resistance of the CMOS transistor 220. Charging current, indicated by symbol I accordingly flows between these input and output terminal 224, 226, respectively when the controllable switch is in a closed or on-state. The value or logic state of the control signal applied to the control terminal 234, CONTROL, determines whether the controllable switch 205, 206 is open or closed.

In the present embodiment, on-resistance between the input and output terminal 224, 226, respectively, of each of the controllable switches 205, 206 is primarily constituted by the drain-source resistance of the CMOS transistor 220 but in other embodiments a resistor of known value may also be arranged in series with this on-resistance. The on-resistance may be tailored to requirements of any particular application but may lie between 1 mΩ and 10Ω, such as between 100 mΩ and 1Ω, for a number of useful embodiments of the present DC-DC converter.

Each of the controllable switches 205, 206 is adapted for unidirectional conduction, or rectification, of the current, I, flowing through the switch by means of a current sensing circuit configured to sense a direction of the charging current flowing through the series resistance, $R_{SERIES}$. The state (open or closed) of the controllable switch is controlled in accordance with the sensed direction of the current flowing through the switch. Appropriate steering of the respective control terminals 234, CONTROL, allows opening and closing of the controllable switches 205, 206 as explained below.

The current sensing circuit comprises a SR latch 228, inverter 232, OR gate 230 and a comparator 222. The comparator 222 detects and responds to a voltage drop across the series resistance, $R_{SERIES}$, because this voltage drop is applied to positive and negative input nodes of the comparator. The comparator 222 accordingly generates a logic low or high output reflecting the voltage drop across the series resistance, $R_{SERIES}$, and therefore also indicating a direction of the charging current I. The comparator output goes logic high or "1" if the voltage on the positive input is larger than the voltage on the negative input. In the opposite situation, in the indicated direction of the charging current I, the comparator output goes logic low or "0".

If the control terminal 234 of a controllable switch 205, 206 is set to logic high or "1", the output of the SR-latch 228 goes logic high which sets the switch SW1 to its closed state so as to conduct the charging current from input node 224 to output node 226. If the control terminal 234 is maintained logic high and charging current, I, flows in the indicated direction, the voltage drop across the series resistance, $R_{SERIES}$, leads to a higher potential at the negative input than the positive input of the comparator 222. This means the comparator output goes logic low causing both inputs of the OR gate 230 to go logic low or "0" which forces the reset input on SR-latch 228 to logic low. Accordingly, the output of the SR-latch 228 stays logic high which sets SW1 to a closed state.

If the charging current, I, now changes direction and the control terminal 234 is maintained logic high, the voltage drop across the series resistance, $R_{SERIES}$, changes sign and the comparator output responds by going logic high causing one input of the OR gate 230 to go logic high or "1" which makes the output of the OR gate 230 transit to logic high. Consequently, the reset input on the SR-latch 228 goes high causing the SR-latch 228 output to logic low which forces the switch SW1 to its open state leading to an interruption or breaking of the conduction of charging current, I, between the input node 224 and output node 226. Consequently, the current sensing circuit is capable of sensing a direction of the current flowing through the series resistance, $R_{SERIES}$, of the controllable switch 205, 206 and automatically interrupt or break current conduction if the current changes direction to the non-conduction direction. However, while this automatic interruption of charging current resembles the unidirectional current conduction, or rectifying, property of a semiconductor diode, the forward voltage drop across the series resistance, $R_{SERIES}$, of the present controllable switch 205, 206 can, as opposed to a forward diode voltage drop, be made extremely low. As previously mentioned the series resistance can readily be brought down to a 100 mΩ or even lower.

Finally, each of the controllable switches 205, 206 can also be forced to its open state by actuating the control terminal 234, CONTROL, without any reversal of the charging current flowing through the series resistance, $R_{SERIES}$. This is performed by returning the control terminal 234 to a logic low state from a prior logic high state. If the control terminal 234, CONTROL, of one of the controllable switches 205, 206 is returned to logic low while the output of the comparator is logic low (indicating current flow in the conducting direction of the controllable switch), one input of the OR gate 230 will go logic high or "1" while the other input is logic low due to its connection to the comparator output. This means that the reset input on SR-latch 228 is logic high while the set input is logic low. Accordingly, the output of the SR-latch 228 goes to logic low so as to change the state of the switch SW1 to its open or non-conducting state.

Figure 3:
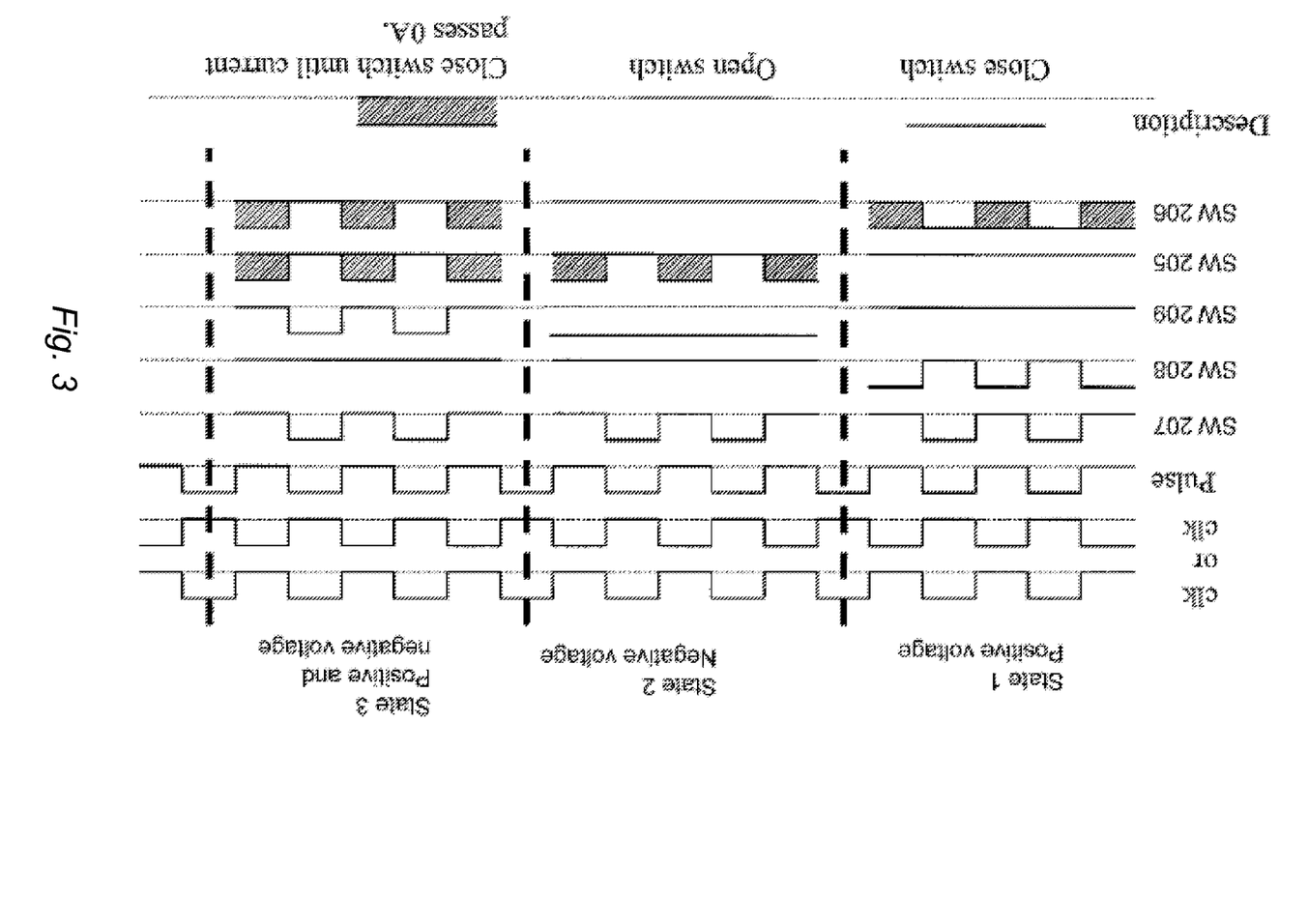
FIG. 3 is a timing diagram of respective control signals to controllable switches of the DC-DC converter circuit depicted in FIG. 1.

FIG. 3 shows a timing diagram for control signals for each of controllable switches 205, 206, 207, 208 and 209 in the previously-mentioned first, second and third converter states or modes of the present DC-DC converter assembly 200. These three converter states are:
State 1: Charge is added to the positive DC voltage output node;
State 2: Charge is added to the negative DC voltage output node;
State 3: Charge is added simultaneously to both the positive DC voltage output node and the negative DC voltage output node.

The three converter states are depicted along the horizontal direction of the timing diagram where boundaries between the individual states are marked by the vertical dotted lines. In the vertical direction of the timing diagram, the following signals are depicted: The clock signals, clk, generated by clock generator 217 (FIG. 1), the pulse signal supplied to the pulse switch 218 and the D flip-flop 215 and respective control signals supplied to the control terminals of the five controllable switches 207, 208, 209, 205 and 206. A horizontal line segment arranged above the dotted line denotes a closed state of the switch in question. A horizontal line segment coincident with the dotted line denotes an open state of the switch in question. A shaded area between horizontal lines denotes the switch is in a closed state until the current passing through the switch changes direction to one opposite to the predetermined forward or conduction direction. In order to avoid that the current runs in the opposite direction of the predetermined forward direction, the switch in question is opened, i.e. off if that happens as explained in detail in connection with FIG. 2. Thus only controllable switches 205 and 206 posses this unidirectional current conduction or rectifying property.

In converter state 1, the controllable switches 207 and 208 are alternatingly placed in closed and opened states by non-overlapping control signals so that external inductor 201 is charged by the DC supply voltage (204 on FIG. 1) when the controllable switch 207 is closed. Energy is transferred to capacitor 203 both when switch 207 closed and at least a fraction of the time when switch 208 is closed due to the inertia of the charging current flow through external inductor 201.

Accordingly, once the controllable switch 207 is opened and the controllable switch 208 is closed, magnetic energy stored in the external inductor 201 is transferred or dumped as charging current into the supply capacitor (203 on FIG. 1) holding charge for the positive DC output voltage. This charging current is transferred through the controllable switch 206 placed in its closed or conducting state as indicated by the timing diagram "SW206" thereof.

Converter state functions in a similar way to converter state 1, but the controllable switch 209 is now set to a closed state while controllable switches 205 and 207 are alternatingly placed in closed and open states by non-overlapping control signals.

In converter state 3, the three ordinary controllable switches 207, 208 and 209 are simultaneous opened while both of the controllable switches 205, 206 are set to their respective closed states. Consequently, the charging current flows from the external inductor 201 to the supply capacitor 203, holding charge for the positive DC output voltage, and through the common ground node between the capacitors 202 and 203 to the negative DC output voltage at node 214.

Figure 4:
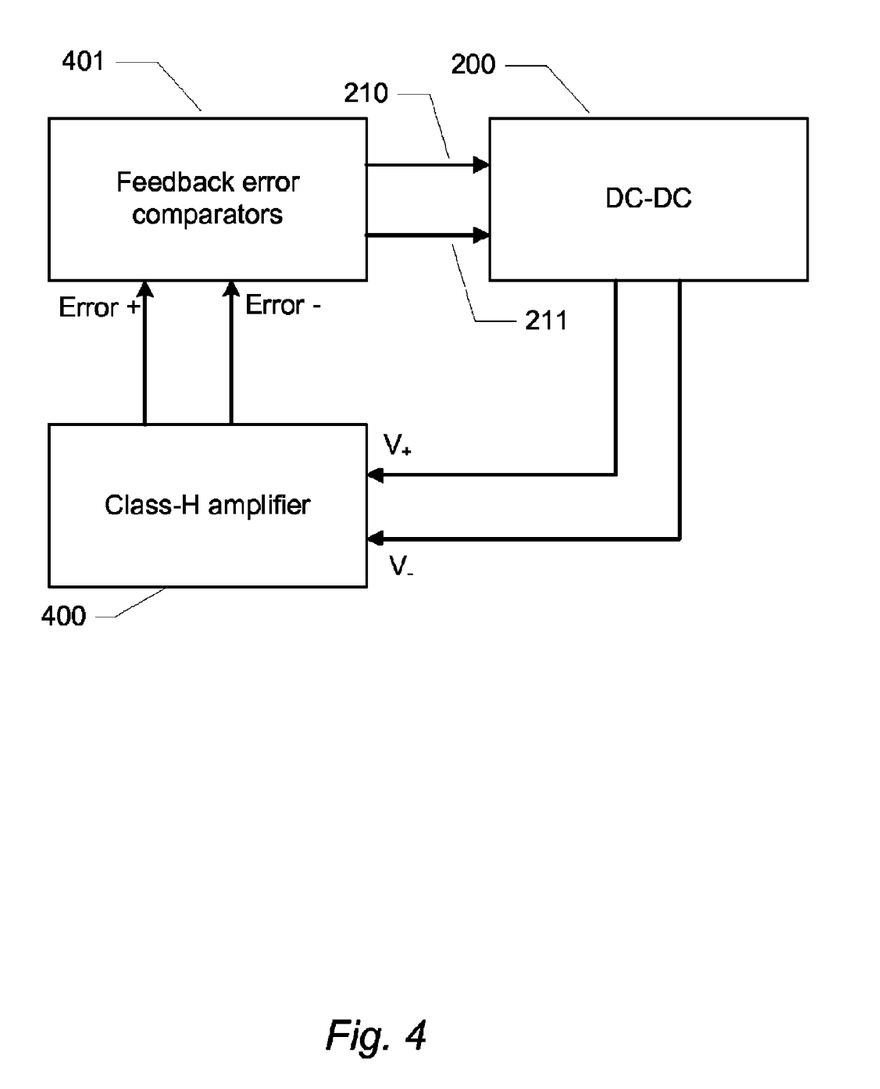
FIG. 4 illustrates a class-H amplifier assembly comprising the DC-DC converter assembly depicted on FIG. 1.

FIG. 4 illustrates an exemplary application of the present DC-DC converter circuit embodiment in form of a class-H amplifier assembly comprising the DC-DC converter assembly 200 depicted on FIG. 1 supplying power to a class-H amplifier 400 through positive and negative DC supply rails V+ and V−, respectively.

The class-H amplifier 400 sends a pair of error signals to a feedback comparator 401 which in response transmits appropriate error control signals to the DC-DC converter assembly 200 through error lines 210 and 211. These error control signals ensure that the voltages supplied as the positive and negative DC output voltages by the DC-DC converter assembly 200 track an instantaneous output signal amplitude of an audio signal generated by the class-H amplifier 400.

Although some embodiments have been described and shown in detail, the invention is not restricted to these, but may also be embodied in other ways within the scope of the subject matter defined in the appended patent claims. In particular, it is to be understood that other embodiments may be utilised and structural and functional modifications may be made without departing from the scope of the present invention.

The invention claimed is:

1. A DC-DC converter circuit comprising:
   a first coupling terminal of a first end of an inductive component and a second coupling terminal of a second end of the inductive component;
   a DC supply terminal to receive a DC input supply voltage;
   first, second, third, fourth and fifth switches including respective control terminals to select states of the first, second, third, fourth and fifth switches;
   a first output terminal connected to a first capacitor and serving as a positive DC voltage node relative to a ground terminal;
   a second output terminal connected to a second capacitor and serving as a negative DC voltage node relative to the ground terminal; and
   a digital controller coupled to the respective control terminals of the first, second, third, fourth and fifth switches so as to control the respective states thereof;
   wherein the first switch is arranged between the second capacitor and the first coupling terminal of the inductive component, the second switch is arranged between the first capacitor and the second coupling terminal of the inductive component, the third switch is coupled between the DC supply terminal and the first coupling terminal of the inductive component, the fourth switch is coupled between the first coupling terminal of the inductive component and ground, and the fifth switch is coupled between the second coupling terminal of the inductive component and ground;
   wherein the inductive component is coupled between the first and second capacitors for supplying charging current to at least one of the first and second capacitors in at least a first, a second, and a third converter state under control of the digital controller;
   wherein in the first converter state, the second and third switches are set to respective closed states to supply charging current to the first capacitor through the inductive component; in the second converter state, the first and fifth switches are set to respective closed states to supply charging current to the second capacitor through the inductive component; in the third converter state, the first switch and the second switch are set to respective closed states to supply charging current from the first capacitor to the second capacitor through the first and second coupling terminals of the inductive component; and the first and second switches are unidirectional current conduction devices.

2. The DC-DC converter circuit according to claim 1, wherein each of the first and the second switches is adapted to:
   sense a direction of charging current flowing through the first and second switches; and
   change state in response to a change of direction of the charging current.

3. The DC-DC converter circuit according to claim 2, wherein each of the first and the second switches comprises a semiconductor transistor switch.

4. The DC-DC converter circuit according to claim 3, wherein each of the first and the second switches comprises:
   a series resistance coupled between input and output nodes of the switch; and
   a current sensing circuit to sense the direction of the charging current flowing through the series resistance and control the state of the switch in accordance with the direction of the charging current.

5. The DC-DC converter circuit according to claim 4, wherein the series resistance of the first or second switch comprises an on-resistance of a semiconductor transistor.

6. The DC-DC converter circuit according to claim 4, wherein the current sensing circuit comprises a comparator operatively coupled across the series resistance of the first or second switch.

7. The DC-DC converter circuit according to claim 4, wherein the current sensing circuit is adapted to:
   respond to a predetermined logic level on the control terminal of the first or second switch by setting the first or second switch to a closed state; and
   automatically change from the closed to the open state in response to a change of direction of the charging current flowing through the switch.

8. The DC-DC converter circuit according to claim 1, wherein a change between continuous and discontinuous mode operation occurs depending on a loading of the negative DC voltage node or the positive DC voltage node.

9. The DC-DC converter circuit according to claim 1, wherein the digital controller discharges energy stored in the inductive component to substantially zero after each charging of the inductive component from the DC input supply voltage.

10. The DC-DC converter circuit according to claim 1, wherein the digital controller generates and applies respective control signals to the control terminals of the first and second switches; and
    each control signal comprises one or more pulses during each of the first, second and third converter states.

11. The DC-DC converter circuit according to claim 10, wherein the one or more pulses of each control signal are of substantially constant duration.

12. The DC-DC converter circuit according to claim 11, wherein the digital controller:
    regulates a positive DC output voltage on the positive DC voltage node by controlling a number of pulses of the control signal supplied to the second switch during the first converter state; and
    regulates a negative DC output voltage on the negative DC voltage node by controlling a number of pulses of the control signal supplied to the first switch during the second converter state.

13. The DC-DC converter circuit according to claim 10, wherein a change from one to another one of the first, second and third converter states occurs for each pulse of the one or more pulses.

14. The DC-DC converter circuit according to claim 1, wherein in the third converter state, the third and fifth switches are closed to charge the inductive component with magnetic energy and then subsequently opened.

15. The DC-DC converter circuit according to claim 1, wherein in the first converter state, the third switch is opened and the fourth switch is closed to discharge the inductive component after charging the first capacitor.

16. A class-H amplifier assembly comprising:
    a DC-DC converter circuit including:
      a first coupling terminal of a first end of an inductive component and a second coupling terminal of a second end of the inductive component;
      a DC supply terminal to receive a DC input supply voltage;
      first, second, third, fourth and fifth switches including respective control terminals to select states of the first, second, third, fourth and fifth switches;

a first output terminal connected to a first capacitor and serving as a positive DC voltage node relative to a ground terminal;

a second output terminal connected to a second capacitor and serving as a negative DC voltage node relative to the ground terminal; and a digital controller coupled to the respective control terminals of the first, second, third, fourth and fifth switches so as to control the respective states thereof;

wherein the first switch is arranged between the second capacitor and the first coupling terminal of the inductive component, the second switch is arranged between the first capacitor and the second coupling terminal of the inductive component, the third switch is coupled between the DC supply terminal and the first coupling terminal of the inductive component, the fourth switch is coupled between the first coupling terminal of the inductive component and ground, and the fifth switch is coupled between the second coupling terminal of the inductive component and ground;

wherein the inductive component is coupled between the first and second capacitors for supplying charging current to at least one of the first and second capacitors in at least a first, a second, and a third converter state under control of the digital controller;

wherein in the first converter state, the second and third switches are set to respective closed states to supply charging current to the first capacitor through the inductive component; in the second converter state, the first and fifth switches are set to respective closed states to supply charging current to the second capacitor through the inductive component; in the third converter state, the first switch and the second switch are set to respective closed states to supply charging current from the first capacitor to the second capacitor through the first and second coupling terminals of the inductive component; and the first and second switches are unidirectional current conduction devices; and a H-class amplifier including a positive DC power supply rail and a negative DC power supply rail, the positive DC voltage node and the negative DC voltage node of the DC-DC converter circuit being coupled to the positive and negative DC power supply rails, respectively.

17. A DC-DC converter circuit, comprising:

an inductive component;

first and second capacitors;

first and second switches connecting the first and second capacitors to first and second terminals of the inductive component, the first and second switches including control terminals and being unidirectional current conduction devices;

a DC supply terminal to receive a DC input supply voltage;

a third switch connecting the DC supply terminal to the first terminal of the inductive component;

fourth and fifth switches connecting the first and second terminals of the inductive component to ground;

first and second DC voltage output terminals connected to the first and second capacitors; and a digital controller coupled to the control terminals of the first, second, third, fourth and fifth switches to control states thereof.

18. The DC-DC converter circuit according to claim 17, wherein the digital controller closes the second and third switches in a first converter state to supply charging current to the first capacitor through the inductive component.

19. The DC-DC converter circuit according to claim 17, wherein the digital controller closes the first and fifth switches in a second converter state to supply charging current to the second capacitor through the inductive component.

20. The DC-DC converter circuit according to claim 17, wherein the digital controller closes the first and second switches in a third converter state to supply charging current from the first capacitor to the second capacitor through the inductive component.

* * * * *